(No Model.)

W. T. KEEFER.
ANIMAL TRAP.

No. 592,632. Patented Oct. 26, 1897.

Witnesses
Roerth.
Victor J. Evans

Inventor
William T. Keefer,
By John Wedderburn
Attorney

THE NORRIS PETERS CO., PHOTO-LITHO., WASHINGTON, D. C.

UNITED STATES PATENT OFFICE.

WILLIAM T. KEEFER, OF BEDFORD, INDIANA.

ANIMAL-TRAP.

SPECIFICATION forming part of Letters Patent No. 592,632, dated October 26, 1897.

Application filed July 12, 1897. Serial No. 644,212. (No model.)

*To all whom it may concern:*

Be it known that I, WILLIAM T. KEEFER, of Bedford, in the county of Lawrence and State of Indiana, have invented certain new and useful Improvements in Animal-Traps; and I do hereby declare the following to be a full, clear, and exact description of the invention, such as will enable others skilled in the art to which it appertains to make and use the same.

This invention relates to new and useful improvements in rat or mouse traps; and it consists of the novel arrangement of simple parts which will be hereinafter fully set forth.

The object of the invention is to produce a trap of the character above mentioned that will be simple in construction, cheap, durable, and efficient in operation.

I am enabled to accomplish the objects of my invention by the simple means illustrated in the accompanying drawings, in which—

Figure 1:
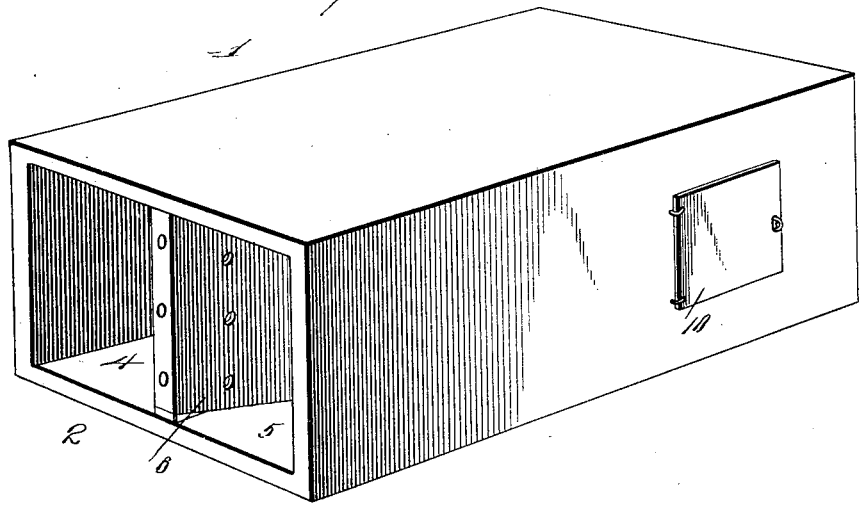
Figure 2:
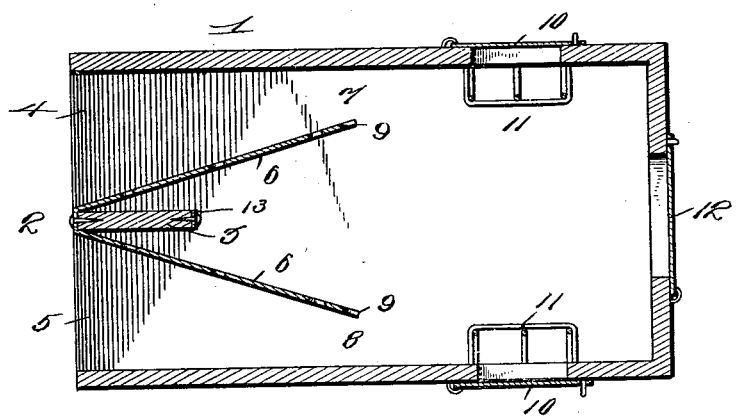

Figure 1 represents a perspective view of my improved trap, and Fig. 2 represents a transverse longitudinal section.

Referring to the drawings, the numeral 1 indicates a trap, which is constructed of any suitable material and open at one end, as indicated by the numeral 2.

The numeral 3 indicates a short partition which is placed in the open end of the box, forming two openings 4 and 5, through which the animals pass in entering the trap. The numeral 6 indicates two wings which are secured to the partition and extend obliquely into the openings, forming narrow passages 7 and 8 at or near the center of the body of the trap. These wings are provided at their inner ends with teeth or spurs 9 to prevent the animal from escaping from the trap, and for convenience I form the wings of a single piece of metal bent at its central portion and secured to the partition 3 at the outer end thereof by any suitable means.

The numeral 10 indicates two doors which I provide on opposite sides of the trap, which are adapted to be opened when it is desired to place bait in the bate-holders 11, which are formed of wire staples extending across the door-openings to form a cage. At the rear of the trap I provide a door 12, through which the animals are taken from the trap. The numeral 13 indicates a metallic strip which is secured to the rear edge of the partition 3 by nails or any other convenient means, and the wings 6 are preferably secured to the forward end of the partition by nails, as shown. The side wings are secured to the partition in such a manner that a small space will be left between the upper and lower edges of said wings and the upper and lower inner sides of the trap. The wings have sufficient spring to be readily pushed to one side as the animal enters and be restored to their normal position after the animal has passed into the trap.

I may, if found desirable, place tin strips in the corners of the rear portion of the trap to prevent the animals from gnawing the wood, of which the trap is preferably constructed.

It will be observed that the trap herein described is especially simple in construction and that any number of animals can enter the trap, the same being of the "ever-set" variety, and when in the same they can be readily seen by animals on the outside of the trap, thus inducing others into said trap, where they will be prevented from escaping.

Having thus fully described my invention, what I claim, and desire to secure by Letters Patent, is—

1. An animal-trap comprising a suitable box having one end thereof open, a short partition extending across said opening, wings formed with spurs or teeth on their inner ends, secured to said partition, and extending at angles obliquely toward the rear of the box, means for securing the bait opposite the openings formed by the partition, doors located at the sides of the box through which the trap is baited, and a door or doors provided in the rear end, or in the sides of the box, for removing the animal from the trap, substantially as and for the purpose set forth.

2. An animal-trap comprising a suitable box having one end thereof open, a short partition extending across said opening, wings formed with spurs or teeth on their inner ends, secured to said partition and having their upper and lower edges approximating the upper and lower inner sides of the box, said wings extending obliquely toward the rear of the box, doors formed in the sides of the box, bait-cages opposite said doors, a door or doors for removing the animals from the trap, substantially as and for the purpose set forth.

In testimony whereof I have signed this specification in the presence of two subscribing witnesses.

WILLIAM T. KEEFER.

Witnesses:
   CHAS. F. GRIMES,
   M. C. ELLIOTT.